US012665349B2

(12) United States Patent
Jutz

(10) Patent No.: US 12,665,349 B2
(45) Date of Patent: Jun. 23, 2026

(54) CLAMPING CABLE FOR CONNECTOR UNITS AND CABLE CONNECTOR UNIT COMPRISING SUCH A CLAMPING ELEMENT

(71) Applicant: Neutrik AG, Schaan (IL)

(72) Inventor: Bernhard Jutz, Rankweil (AT)

(73) Assignee: Neutrik AG, Schaan (LI)

( * ) Notice: Subject to any disclaimer, the term of this patent is extended or adjusted under 35 U.S.C. 154(b) by 269 days.

(21) Appl. No.: 18/558,209

(22) PCT Filed: Apr. 27, 2022

(86) PCT No.: PCT/EP2022/061201
§ 371 (c)(1),
(2) Date: Oct. 31, 2023

(87) PCT Pub. No.: WO2022/242996
PCT Pub. Date: Nov. 24, 2022

(65) Prior Publication Data
US 2024/0235105 A1 Jul. 11, 2024

(30) Foreign Application Priority Data
May 21, 2021 (AT) ................................. A 5042/2021

(51) Int. Cl.
*H01R 13/58* (2006.01)
*H01R 13/59* (2006.01)
*G02B 6/38* (2006.01)

(52) U.S. Cl.
CPC ..... *H01R 13/5812* (2013.01); *H01R 13/5825* (2013.01); *H01R 13/5837* (2013.01); *H01R 13/59* (2013.01); *G02B 6/3888* (2021.05)

(58) Field of Classification Search
CPC ............ H01R 13/5812; H01R 13/5825; H01R 13/5837; H01R 13/59
USPC .......................................................... 439/449
See application file for complete search history.

(56) References Cited

U.S. PATENT DOCUMENTS

| | | | |
|---|---|---|---|
| 6,403,884 B1 * | 6/2002 | Lange ................... | H01R 13/622 |
| | | | 174/653 |
| 11,515,661 B2 * | 11/2022 | Zechmann ............. | H01R 24/64 |
| 2018/0366873 A1 | 12/2018 | Menolotto et al. | |
| 2021/0098932 A1 * | 4/2021 | Zechmann ............. | H01R 24/64 |
| 2024/0088599 A1 * | 3/2024 | Tay ....................... | H02G 15/117 |
| 2025/0125553 A1 * | 4/2025 | Dobler ................. | H01R 13/501 |

FOREIGN PATENT DOCUMENTS

| | | | | |
|---|---|---|---|---|
| DE | 3512578 | 10/1986 | | |
| DE | 19926430 C1 * | 2/2001 | ......... | H01R 13/5812 |
| DE | 10011341 A1 * | 9/2001 | ......... | H01R 13/5837 |

(Continued)

OTHER PUBLICATIONS

Machine Translation of WO 2020250575 (Year: 2020).*

*Primary Examiner* — Tulsidas C Patel
*Assistant Examiner* — Thomas K Quigley
(74) *Attorney, Agent, or Firm* — Volpe Koenig

(57) ABSTRACT

A clamping element (10), which can be radially compressed at least in part, and engages around and clamps a cable (K) of a cable connector unit once the threaded connection of clamping sleeve (3) and housing (1) is tightened. A cable connector unit using such a clamping element (10) is also provided.

7 Claims, 11 Drawing Sheets

(56)          References Cited

FOREIGN PATENT DOCUMENTS

| | | | | |
|---|---|---|---|---|
| DE | 10011341 | C2 * | 3/2002 | ......... H01R 13/5205 |
| DE | 10062476 | A1 * | 6/2002 | ......... H01R 13/5825 |
| DE | 102009042678 | | 5/2011 | |
| DE | 202012101449 | | 7/2013 | |
| EP | 2744060 | | 6/2014 | |
| JP | 2016532281 | A | 10/2016 | |
| JP | 2020202117 | A | 12/2020 | |
| WO | WO-2014118389 | A1 * | 8/2014 | ......... H01R 13/6592 |
| WO | WO-2019192753 | A1 * | 10/2019 | ........... H01R 13/516 |
| WO | 2020250575 | | 12/2020 | |

* cited by examiner

CLAMPING CABLE FOR CONNECTOR UNITS AND CABLE CONNECTOR UNIT COMPRISING SUCH A CLAMPING ELEMENT

CROSS-REFERENCE TO RELATED APPLICATIONS

This application is a 371 National Phase of International Application No. PCT/EP2022/061201, filed Apr. 27, 2022, which claims priority from Austrian Patent Application No. A50402, filed May 21, 2021, both of which are incorporated herein by reference as if fully set forth.

TECHNICAL FIELD

The invention relates to a clamping part for use in a cable connector assembly for electrical and/or optical cables.

BACKGROUND

In the field of entertainment electronics, stage technology and the transmission of optical and acoustic signals, as well as the supply of electrical power to consumers in these areas, very high demands are placed on the components used. These relate, on the one hand, to robustness, protection of the plug connections from dust, moisture and accidental disconnection, and also safety.

Cable connector assemblies for use with electrical and/or optical cables, involving both data and power supply, often have a modular design. They typically comprise a housing for receiving and protecting the contact elements for making electrical and/or optical contact with a complementary connector assembly. An at least partially radially compressible clamping part encompasses and clamps the cable. A clamping sleeve can be screwed onto the rear end of the housing, the action of which clamping sleeve causes all the aforementioned components of the cable connector assembly and the cable to be clamped together. This provides strain relief for the cable.

The clamping part for clamping the cable in the cable connector assembly is typically provided with at least one radially compressible section that encloses the cable and clamps the cable in the compressed state and a front edge region for resting against a housing of the cable connector assembly and/or a connector extension inserted therein. The rear section in this case is usually formed by a number of clamping tongues distributed around the circumference, which clamping tongues can preferably be elastically compressed in the radial direction.

For surface-mounted or flush-mounted boxes, as disclosed in EP 2744060 A1, for example, a strain relief part for use in the region of the cable entry is known in the art, which has clamping tongue-like formations. These are differently shaped, but the strain relief part is not radially compressible.

Clamping parts or strain relief parts with radially elastically deformable clamping tongues, all of which are identically designed, however, are disclosed in DE 202012101449 U1 or DE 102009042678 B3.

Nowadays, there is an increasing demand for cable connector assemblies structured in this way to be suitable for a wide range of applications, particularly with a single design that can cover a large range of cable diameters.

SUMMARY

The object of the present invention is to overcome the disadvantages of the prior art and to provide a device by means of which a single clamping part in a cable connector assembly can clamp cables with different properties, specifically can cover a large range of cable diameters.

This object is achieved by a device having one or more of the features disclosed herein. Further features can be inferred from the description and the drawings.

The clamping part according to the invention is characterized by at least two different kinds of clamping tongues. This then leads to different properties of the various groups of clamping tongues, thereby allowing a plurality of different cable types to be securely clamped. This clamping part can be advantageously used in a cable connector assembly, as described above, but it can also be used on its own in other, including conventional, cable connector assemblies.

A preferred embodiment in this case is one in which each clamping tongue of a first group of clamping tongues is wider, at least at the end facing away from the clamping part, than the clamping tongues of a second group of clamping tongues. Advantageously, between every two clamping tongues of one group, there is a clamping tongue of another group, viewed in the circumferential direction. Where there are two different kinds of clamping tongues, each clamping tongue of a first group is therefore followed by a clamping tongue of the second group, and vice versa.

Another inventive embodiment is characterized in that the first clamping tongues widen as the distance from the front edge of the clamping part increases. Continuous widening is preferably provided in this case, in order to ensure even application over the entire range of movement of the clamping tongues without a sudden application of force on the neighboring clamping tongues.

These clamping tongues preferably have chamfered side edges. This means, particularly in the preferred case, that wherein the width increases as the distance from the central axis of the clamping part becomes radially greater, any additional clamping tongues arranged therebetween are compressed still further radially inwards and the effect of the reduction in diameter or the clamping action is thereby enhanced.

In order to improve the clamping action, the first clamping tongues preferably have a section at their end which is designed to exert a clamping action on a cable for form-fitting penetration of the cable jacket.

Another embodiment of the clamping part according the invention provides that the clamping tongues of a second group of clamping tongues are slightly narrower, as a result of which elastic deflection is facilitated and radial compression is easier or possible to a greater extent.

It is preferably provided in this case that the side edges of the clamping tongues of the second group run parallel to one another, preferably over their entire length.

In order to improve the clamping action of the clamping tongues in the second group, a region designed to increase the holding effect on the cable extends from the outer end of the clamping tongues almost to the inner end thereof.

In order to be able to cover a wide range of cable diameters with the clamping part according to the invention, in a preferred embodiment of the invention the clamping part is characterized in that when the clamping tongues are aligned with the front edge region, the clearance width between the ends of the clamping tongues is between 70 and 95% of the diameter of the clamping part, and when the clamping tongues are compressed to the maximum, wherein the first clamping tongues are adjacent to one another, the clearance width between the ends of the clamping tongues, preferably between the clamping tongues of the second group, is between 10 and 40% of the diameter of the clamping part.

The clamping part according to the invention is preferably used in a cable connector assembly for electrical and/or optical cables, involving both data and power supply. These assemblies often have a modular structure and typically include, in addition to the clamping part for clamping the cable, a housing for receiving and protecting the contact elements for making electrical and/or optical contact with a complementary connector assembly, and also a clamping sleeve screwed onto the rear end of the housing. By their action when making the screw connection to the housing, all the aforementioned components of the cable connector assembly and the cable are clamped to one another, providing strain relief for the cable.

A cable connector assembly of this kind preferably also has a tightening sleeve, the length of which tightening sleeve is less than that of the clamping sleeve and which is coaxially slipped over at least a portion of the clamping sleeve, and a unidirectional lock between the clamping sleeve and the tightening sleeve, which prevents a relative rotation of the tightening sleeve and the clamping sleeve beyond a certain extent in the tightening direction of the threaded connection between the clamping sleeve and the housing. As a result, during manual rotation of the tightening sleeve, the lock engages after a certain circumferential play, and during further rotation of the tightening sleeve, the clamping sleeve lying thereunder is also carried along and rotated to establish the threaded connection to the housing. If necessary, similarly to a ratchet arrangement, the tightening sleeve can be turned back and forth multiple times, always within the same angular range, to tighten the threaded connection, and this simplifies the assembly of the cable connector assembly still further. However, when the tightening sleeve is rotated in the opposite direction, the lock does not engage and the tightening sleeve turns freely without engaging the threaded connection in the loosening direction.

The device in this case, having a tried-and-tested and functionally secure structure, is preferably characterized by a serrated lock or toothed lock between the clamping sleeve and the tightening sleeve, wherein a guide having at least one long, flat flank and at least one steep flank pointing in the opening direction of the threaded connection between the clamping sleeve and the housing is formed on either the tightening sleeve or the clamping sleeve, and a locking pawl with a substantially complementary shape is formed on the other component.

A preferred embodiment of the invention involves changing the height of the guide and the locking pawl in a direction parallel to the axis of rotation of the clamping sleeve and the tightening sleeve. This allows for a construction of the arrangement of the clamping sleeve and the tightening sleeve that has a minimum dimension in the radial direction.

An advantageous embodiment of the invention is further characterized in that the length of the locking pawl accounts for only a fraction of the length of the guide. A preferred variant involves the length of the locking pawl being at most 10% of the length of the guide.

In terms of production, a particularly advantageous embodiment is one in which the guide is formed on the clamping sleeve and the locking pawl is formed on the tightening sleeve.

However, since there is sometimes a need to take apart the cable connector assembly secured against manual disassembly, and to allow this to be carried out by means of a tool, another feature of the invention is that the rear edge of the clamping sleeve lying opposite the thread projects beyond the rear edge of the tightening sleeve, and has engagement points for a tool to apply torque to the clamping sleeve.

Particularly favorable in this case is an embodiment of the invention in which the engagement points are formed by at least one pair of flat surfaces which are parallel to one another and are arranged opposite one another with respect to the longitudinal central axis of the clamping sleeve. In this way, torque can be applied to the clamping sleeve by means of a wrench or similar tools, either to release the threaded connection altogether and be able to disassemble the cable connector assembly, or also to be able to tighten the threaded connection using a precisely defined torque without risking damage to the lock and the corresponding components.

Particularly preferable in this case is an embodiment in which the width of the flat surfaces in the direction of the longitudinal central axis ranges between 1 mm and 10 mm. A width between 3 mm and 6 mm is preferably chosen. A secure engagement point for the tool and an adequate contact area for applying the required torque are thereby guaranteed.

Another advantageous embodiment of the invention is characterized by a stop that limits the movability of the tightening sleeve in respect of the rear edge of the clamping sleeve. This ensures that the tightening sleeve cannot slip off the clamping sleeve or be accidentally pushed down.

A specific and structurally easy-to-produce embodiment of a safeguard of this kind preventing the removal of the tightening sleeve is provided according to the invention by a projection of the rear edge of the clamping sleeve that extends over at least part of the circumference, wherein the radial extent of the projection is greater than the inner diameter of a rear opening of the tightening sleeve.

In this case, an embodiment is preferred in which the radial extent of the circumferential projection diminishes towards the rear end. This makes it easier for the cable connector assembly to be put together, in that the tightening sleeve can be slid onto the clamping sleeve from behind and pushed over the edge region of the clamping sleeve with slight elastic expansion of its rear edge region.

In order to compensate for play between the clamping sleeve and the tightening sleeve, an advantageous embodiment of a cable connector assembly according to the invention is characterized by at least one protrusion on the outside of the clamping sleeve, which protrusion bridges the space between the clamping sleeve and the tightening sleeve at least for the most part. This reduces the extent to which the clamping sleeve and the tightening sleeve strike against one another during movements of the cable connector, as may occur, for example, when it is used as a speaker connector, on account of the vibrations. The protrusions preferably completely bridge the space between the two coaxial sleeves, thereby completely eliminating any rattling or clattering too.

In order to prevent unintended loosening of the threaded connection between the clamping sleeve and the housing during vibrations of the cable connector assembly, another advantageous embodiment of the invention is characterized by a unidirectional lock between the clamping sleeve and the clamping part. This is designed in such a manner as to prevent relative rotation of the clamping sleeve and the clamping part in the opening direction of the threaded connection between the clamping sleeve and the housing.

For this purpose, a preferred embodiment provides a form-fit lock or toothed lock between the clamping sleeve and the tightening sleeve, wherein at least one detent is formed on either the tightening sleeve or the clamping sleeve, and at least one locking pawl is formed on the other component.

Particularly advantageous in relation to force distribution, and therefore mechanical stability, is an embodiment according to the invention having multiple, preferably three, sawtooth-shaped locking pawls with short flanks facing in the opening direction of the threaded connection between the clamping sleeve and the housing distributed over the circumference.

BRIEF DESCRIPTION OF THE DRAWINGS

To better understand the invention, it is explained in greater detail with reference to the following figures.

The figures each show as a greatly simplified, schematic representation.

DETAILED DESCRIPTION

It should be noted to begin with that in the differently described embodiments, identical parts are provided with identical reference signs or identical component names, wherein the disclosures contained in the overall description can be applied analogously to identical parts with identical reference signs or identical component names. Also, the positional indications chosen in the description, such as top, bottom, side, etc., are based on the immediately described and depicted figure, and these positional indications should be transferred analogously to the new position in the event of a change in position.

Figure 1:
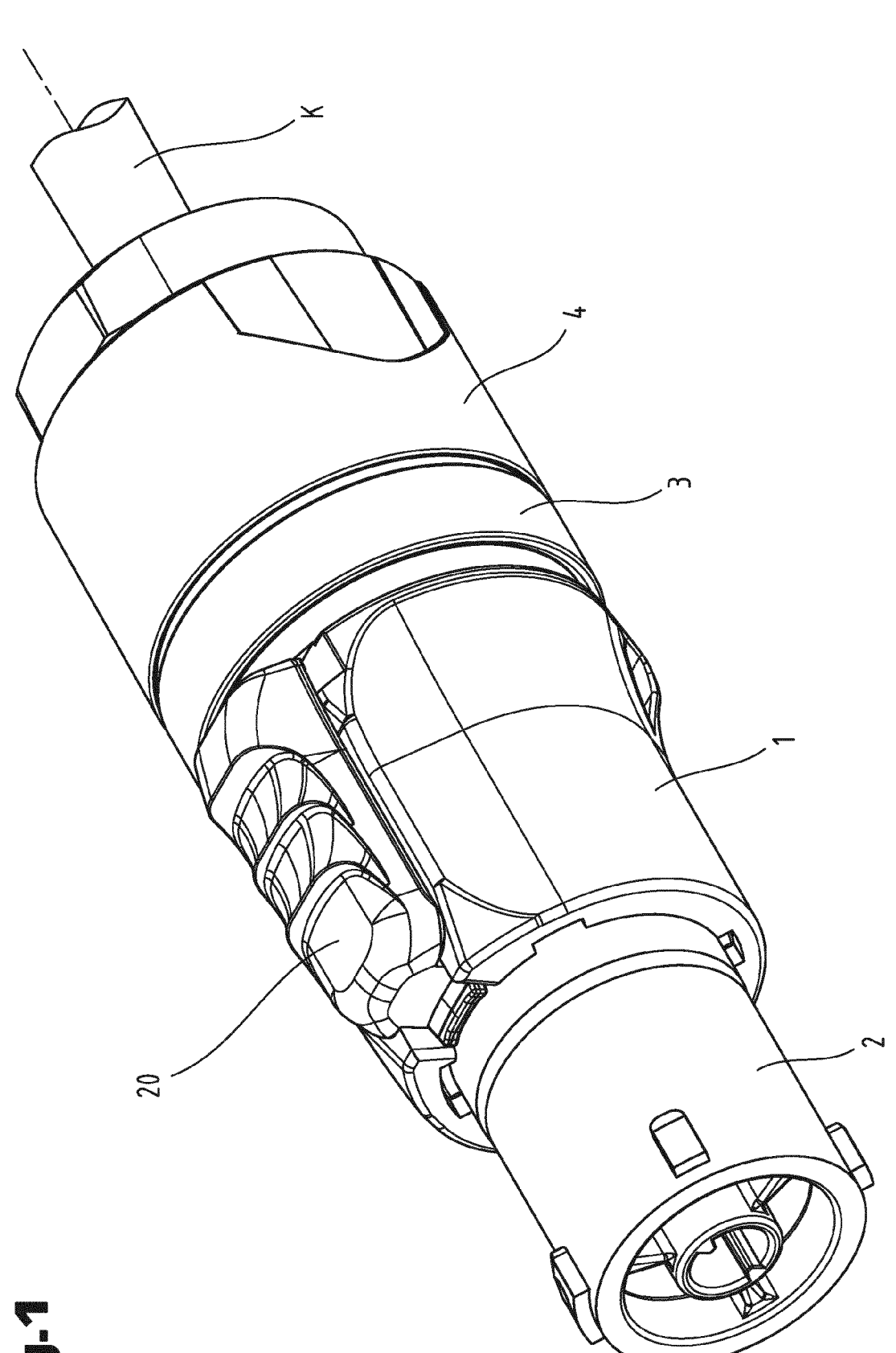
FIG. 1 a perspective view of a first embodiment of a cable connector assembly according to the invention.

FIG. 1 shows by way of example a specific embodiment of a cable connector assembly according to the invention for connection to a complementary connector arrangement, as is typically used for power cables or speaker cables in the field of stage technology and event technology. Identical or similar arrangements are possible for all kinds of electrical and/or optical cables.

A connector extension 2 projects forwards from a housing 1 to a complementary connector not shown here. The contact elements for making electrical and/or optical contact with a complementary connector arrangement are arranged in a protected manner within the connector extension 2. The housing 1 preferably includes an unlocking slide 20 for releasing a preferably provided locking mechanism with the complementary connector. The rear section of the cable connector assembly is formed by an assembly consisting of a clamping sleeve 3 and a tightening sleeve 4 slid on coaxially thereto. The cable K exits from the rear end of the cable connector assembly.

Figure 2:
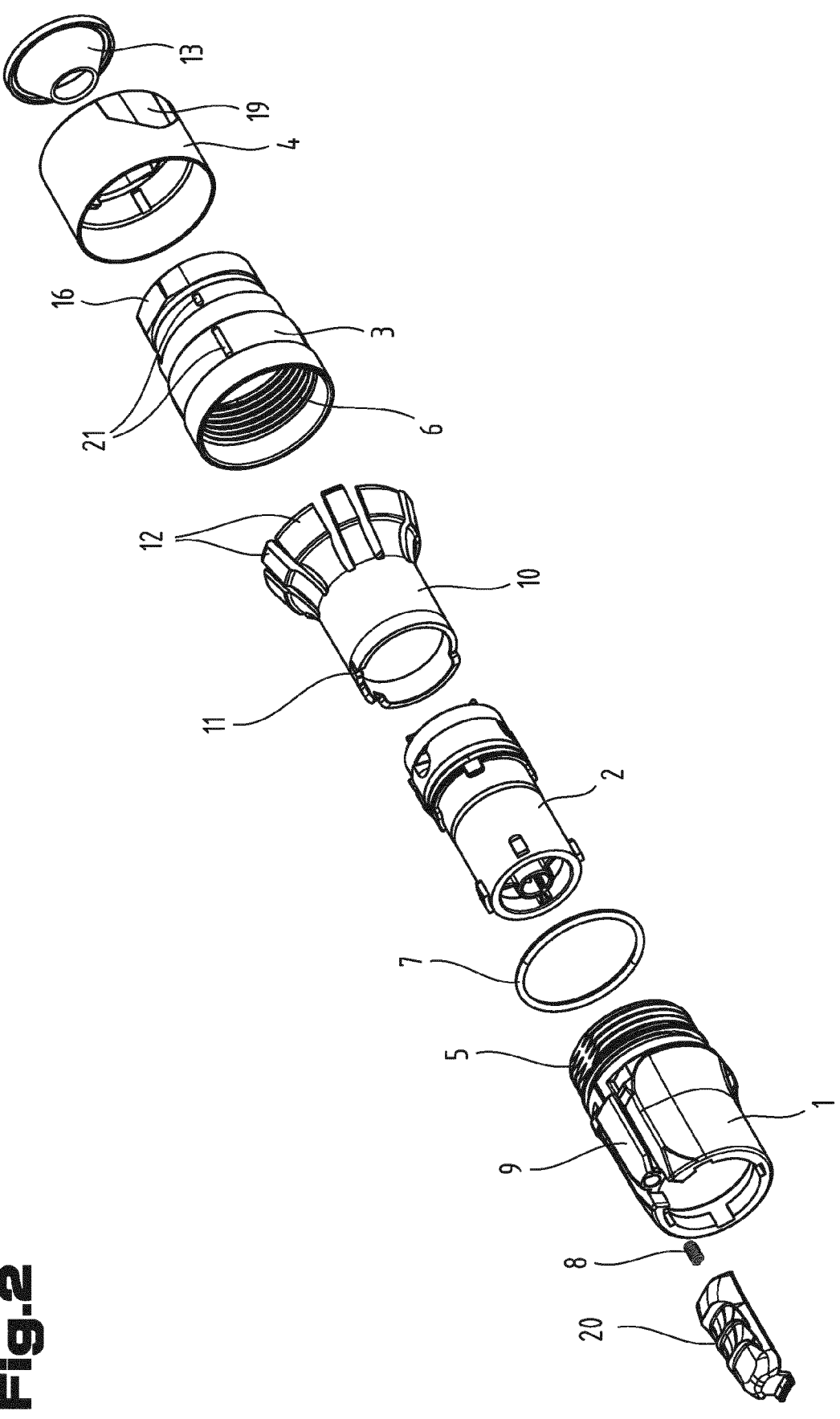
FIG. 2 an exploded view of the cable connector assembly in FIG. 1.

As shown in the exploded view in FIG. 2, the connector extension 2 is typically inserted into the housing 1 from behind. However, it could also be an integral part of the housing 1 which has an external thread 5 at the rear edge, for example, in order to establish a threaded connection with an internal thread 6 in the front region of the clamping sleeve 3. A sealing ring 7 may be placed between the housing 1 and the connector extension 2. A spring element 8 ensures the return of the unlocking slide 20, which is displaceable on a web 9 on the housing 1 in the longitudinal direction.

The cable connector assembly according to the invention typically further comprises a clamping part 10, often also referred to as a collet. The clamping part 10 is slipped onto the cable K, either in the longitudinal cable direction or, if there is a longitudinal slot, also from a radial direction, and rests against the housing 1 and/or the connector extension 2 inserted therein with its front edge region 11. The rear section of the clamping part 10 in the embodiment according to the invention is formed by a number of clamping tongues 12 distributed around the circumference, which clamping tongues can preferably be elastically compressed in the radial direction, in order to clamp the cable K passing through between them. The radial compression of the differently designed clamping tongues 12 occurs when the clamping sleeve 3 is slipped on and when the threaded connection is established between the housing 1 and the clamping sleeve 3. During this process, all the aforementioned components of the cable connector assembly and the cable are clamped together, ensuring precise positioning of the components and strain relief for the cable K.

A sealing cuff 13 is arranged at the rear end of the cable connector assembly, preferably in the region of the rear edge of the clamping sleeve 3, through which the cable K exits the cable connector assembly.

Figure 3:
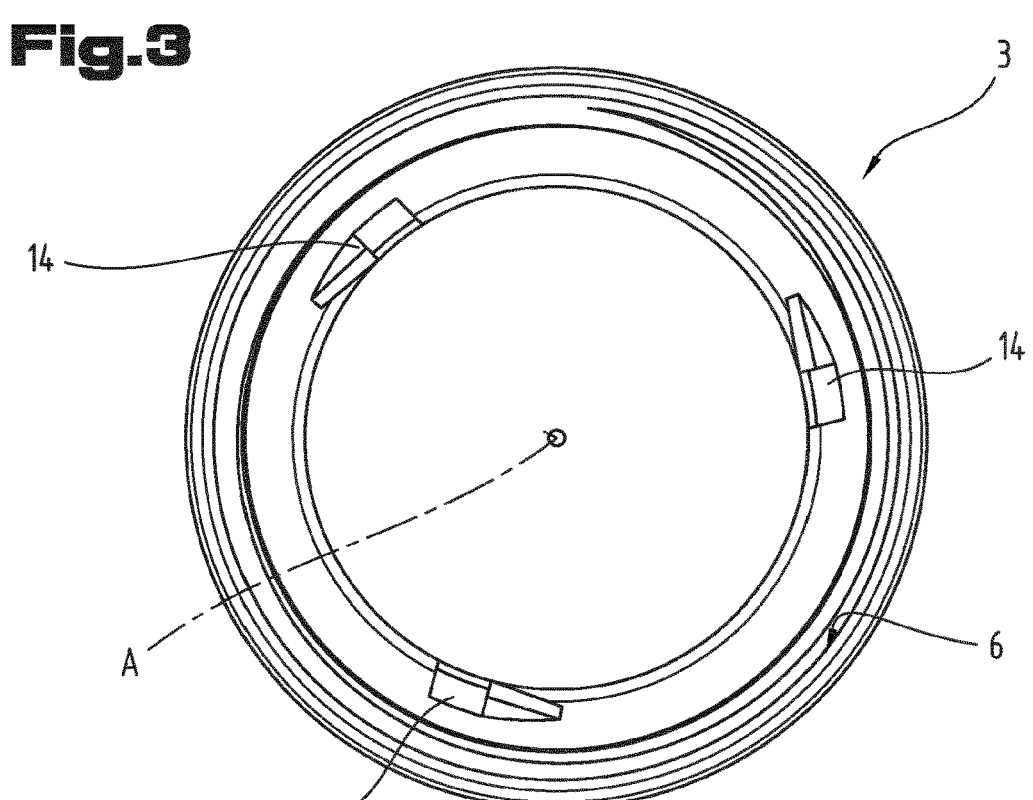
FIG. 3 a front view of a clamping sleeve according to the invention for use in a cable connector assembly.

FIG. 3 shows a view of the clamping sleeve 3 according to the invention as seen from the housing 1. It can be seen here that at least the inner diameter from the front edge of the clamping sleeve 3, at which the thread 6 is arranged, to the opposite rear end preferably tapers conically or in a stepped manner. This means, among other things, that when the threaded connection to the housing 1 is tightened, wherein the clamping sleeve 3 moves axially in the direction of the housing 1, the clamping part 10, in particular the clamping tongues 12, are radially compressed and the entire clamping part 10 is also pushed forwards in the direction of the housing 1, in order to clamp the cable K inside the clamping part.

Three locking pawls 14 which are part of a form-fit lock or toothed lock between the clamping sleeve 3 and the clamping part 10 are arranged in the longitudinal section of the clamping sleeve 3 which comes to rest in the region of the clamping tongues 12 when the housing 1 and clamping sleeve 3 are screwed to one another. Three locking pawls 14 of this kind or similar, radially inwardly facing projections are preferably provided on the inside of the clamping sleeve 3, preferably evenly distributed around the circumference. Viewed in the circumferential direction, they have a saw-tooth-like shape, wherein their short flanks face in the opening direction of the threaded connection between the clamping sleeve 3 and the housing 1. The lateral edges of the clamping tongues 12 of the clamping part 10 each form a catch against which the locking pawls 14 can rest with their short flanks, thereby providing the corresponding part of the unidirectional lock between the clamping sleeve 3 and the clamping part 10, which prevents a relative rotation of the clamping sleeve 3 and the clamping part 10 in the opening direction of the threaded connection between the clamping sleeve 3 and the housing 1 and thereby secures this threaded connection to prevent accidental loosening. In the opposite direction, through the application of force, the locking pawl 14 with a long flank, viewed relatively to the short flanks resting against the clamping tongues 12, can be pressed over the edges of said clamping tongues 12 and the threaded connection thereby tightened. The positioning of locking pawls and catches on the clamping sleeve and clamping part could also be selected in reverse, as described above.

Figure 4:
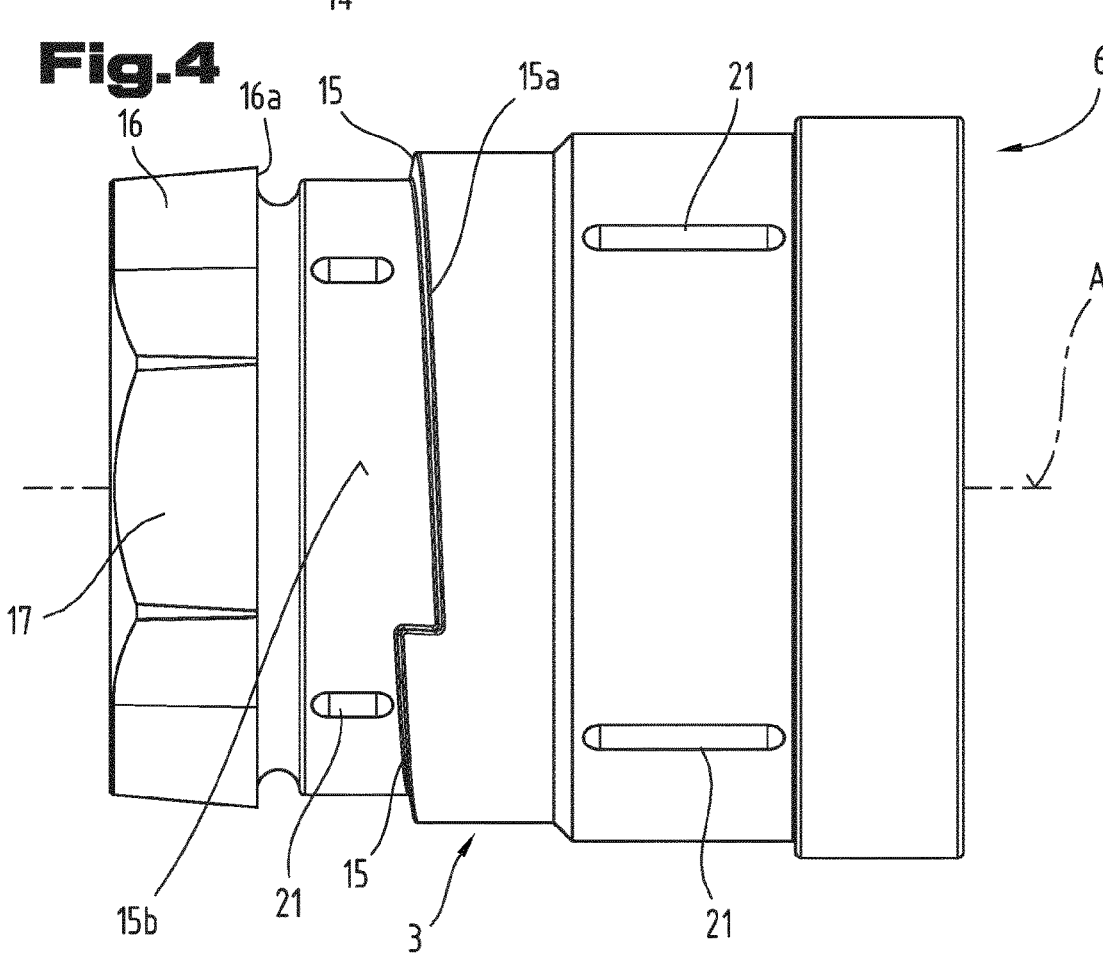
FIG. 4 a side view of the clamping sleeve in FIG. 3.
Figure 5:
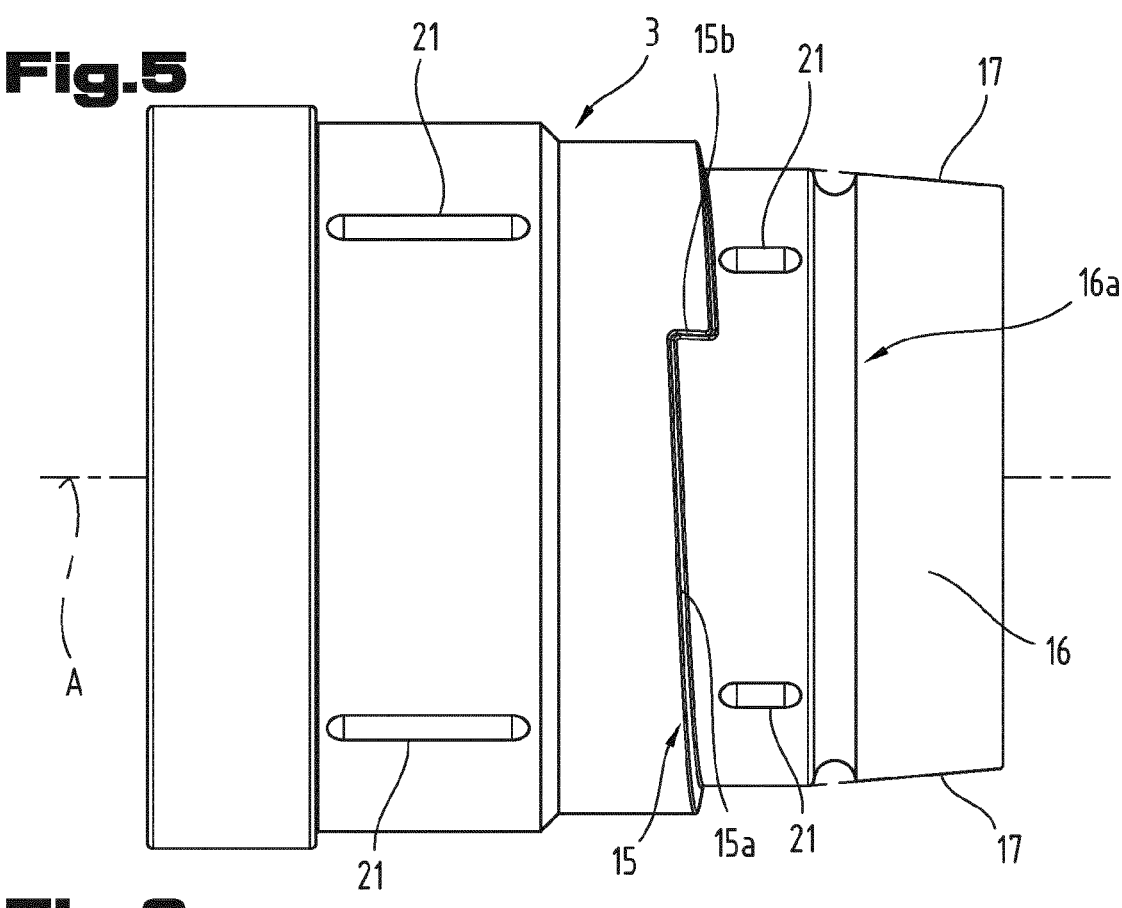
FIG. 5 a side view of the clamping sleeve in FIG. 3 from an orthogonal direction.

In the side views of the clamping sleeve 3 according to the invention in FIG. 4 and FIG. 5, an outer diameter decreasing in steps on the outside from the front edge with the internal thread 6 towards the rear edge can be seen. A circumferential guide 15 that is slightly beveled in the circumferential direction is formed in the central longitudinal section, said guide running around the clamping sleeve 3 with at least one long, flat flank 15a and at least one steep flank 15b facing in the opening direction of the threaded connection between the clamping sleeve 3 and the housing 1.

At the rear edge of the clamping sleeve 3, a projection 16 of the rear edge of the clamping sleeve 3 is provided that extends over at least part of the circumference. At least at some points along the circumference, preferably over the entire circumference of the clamping sleeve 3, the radial extent of this projection 16 is greater than the inner diameter of a rear opening of the tightening sleeve 4, and it thereby holds the tightening sleeve 4 in the coaxial position slipped onto the clamping sleeve 3 and ensures that the tightening sleeve 4 cannot accidentally slide off or be removed from the clamping sleeve 3. The projection 16 forms a rear, limiting stop 16a for the tightening sleeve 4.

In this case, the projection 16 is designed in such a manner, however, that its radial extent decreases towards the rear end and thereby makes it easier to slide the tightening sleeve 4 onto the clamping sleeve 3, wherein at least the rear edge region of the tightening sleeve preferably easily widens elastically.

At least one engagement point 17 for a tool 17 is arranged at the projection 16 on the rear section of the clamping sleeve 3 extending beyond the tightening sleeve 4. A torque can thereby be applied to the clamping sleeve 3, even if this should not be possible purely manually on account of the dimensions of the projection 16. At least two engagement points 17 are preferably created in the form of at least one pair of flat surfaces lying in the longitudinal direction parallel to the central plane of the clamping sleeve 3, which flat surfaces are arranged parallel to one another and opposite one another with respect to the longitudinal central axis A of the clamping sleeve 3. Typically, the flat surfaces have a width of between 1 mm and 10 mm in the direction of the longitudinal central axis, preferably a width of between 3 mm and 6 mm is chosen.

FIG. 7 to FIG. 10 show the tightening sleeve 4 coaxially slipped onto the clamping sleeve 3 according to the invention. Its length is shorter than that of the clamping sleeve 3 and it covers a portion of the clamping sleeve 3 coaxially and in the longitudinal direction. To enable tightening of the threaded connection between the clamping sleeve 3 and the housing 1 via the tightening sleeve 4, a unidirectional lock is provided between the clamping sleeve 3 and the tightening sleeve 4. This prevents a relative rotation of the tightening sleeve 4 and the clamping sleeve 3 beyond a certain amount or circumferential play in the tightening direction of the threaded connection, allowing a driving of the clamping sleeve 3 lying thereunder once the play has been overcome, and with the lock in the engaged state, during further rotation of the tightening sleeve 4

Figure 9:
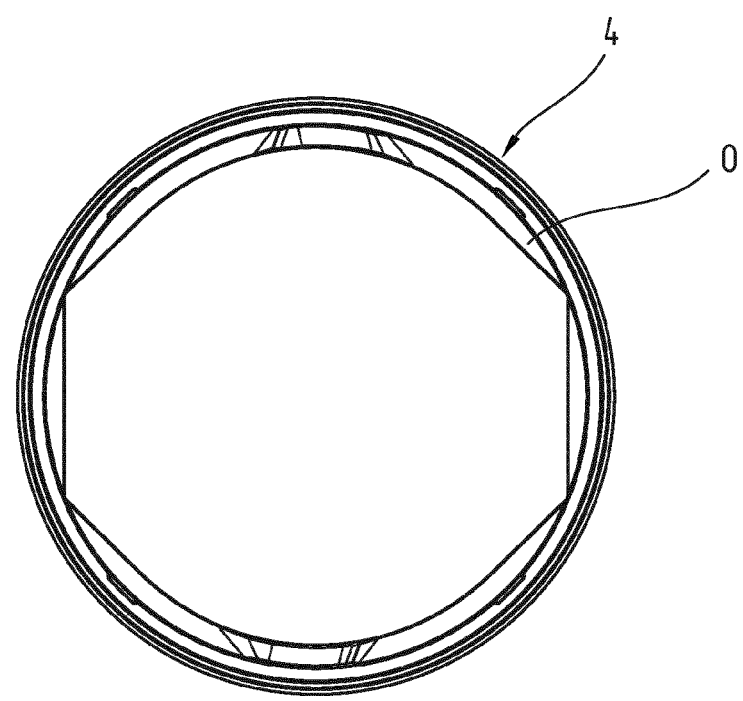
FIG. 9 a front view of the tightening sleeve in FIG. 7.
Figure 10:
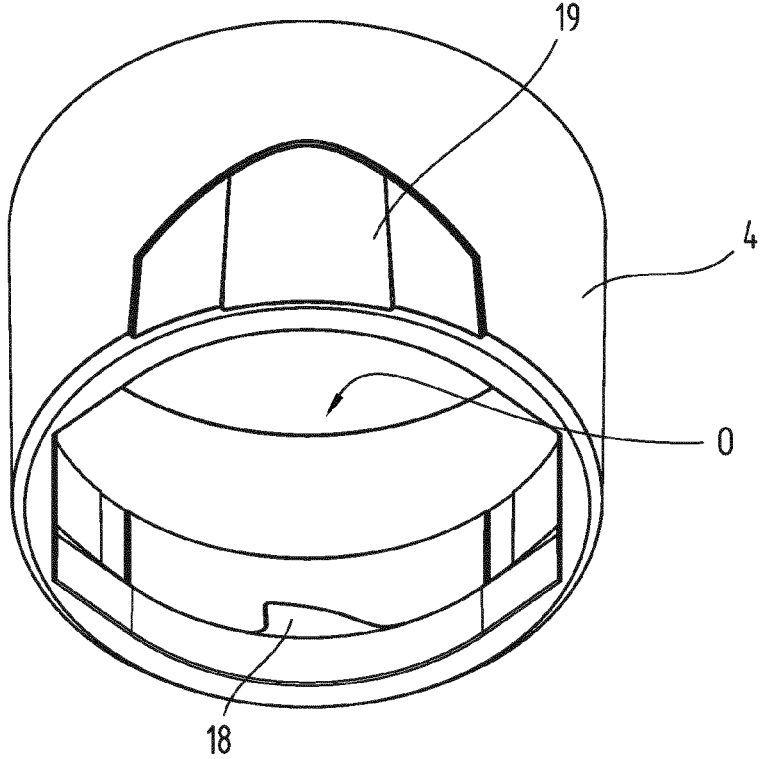
FIG. 10 a perspective view of the tightening sleeve in FIG. 7.

A form-fit lock or toothed lock is also advantageously used between the clamping sleeve 3 and the tightening sleeve 4. In this case, at least one locking pawl 18 of the tightening sleeve 4 engages with the guide 15 of the clamping sleeve described above in the locking direction, as can be seen in FIG. 9 and FIG. 10, with a form that is substantially complementary to the guide 15. Preferably, the length of the locking pawl 18, or of each locking pawl 18, is only a fraction of the length of the guide 15, and the locking pawls 18 are evenly distributed around the circumference of the tightening sleeve 4 in the rear longitudinal section closer to the rear opening O. A preferred variant envisages that the length of the locking pawl 18 is at most 10% of the length of the guide 15, in particular the longer, flat flank 15a thereof. Although it is often also advantageous in production terms to form the guide 15 on the clamping sleeve 3 and to provide the locking pawls 18 on the tightening sleeve 4, this arrangement could also be reversed.

Figure 6:
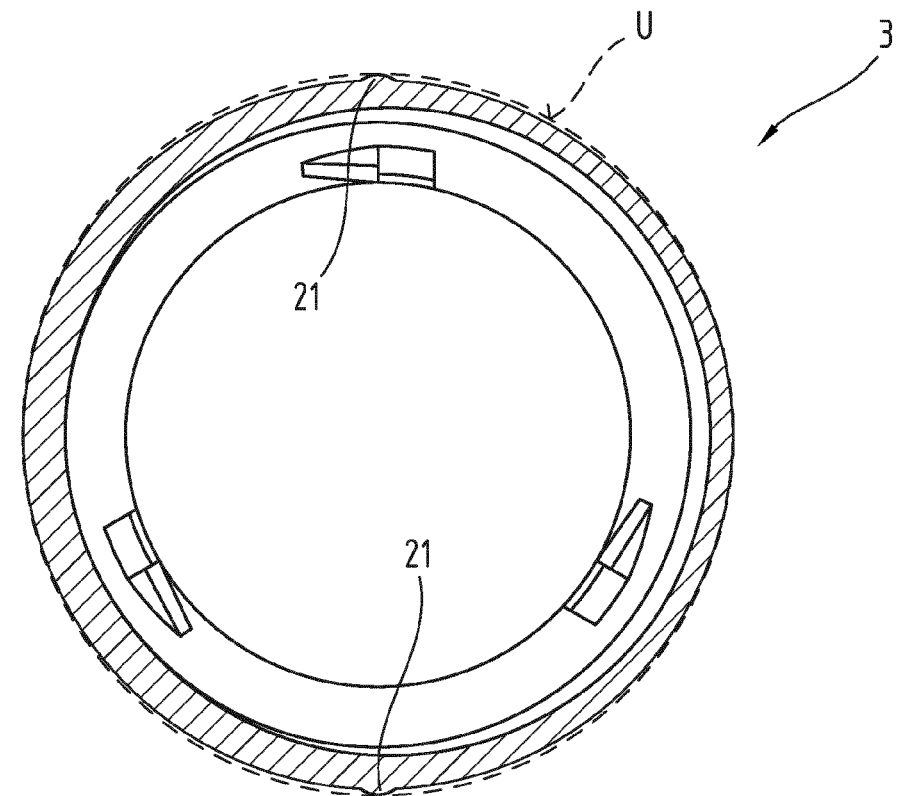
FIG. 6 a cross section through another embodiment of a clamping sleeve at the level of the protrusions.
Figure 7:
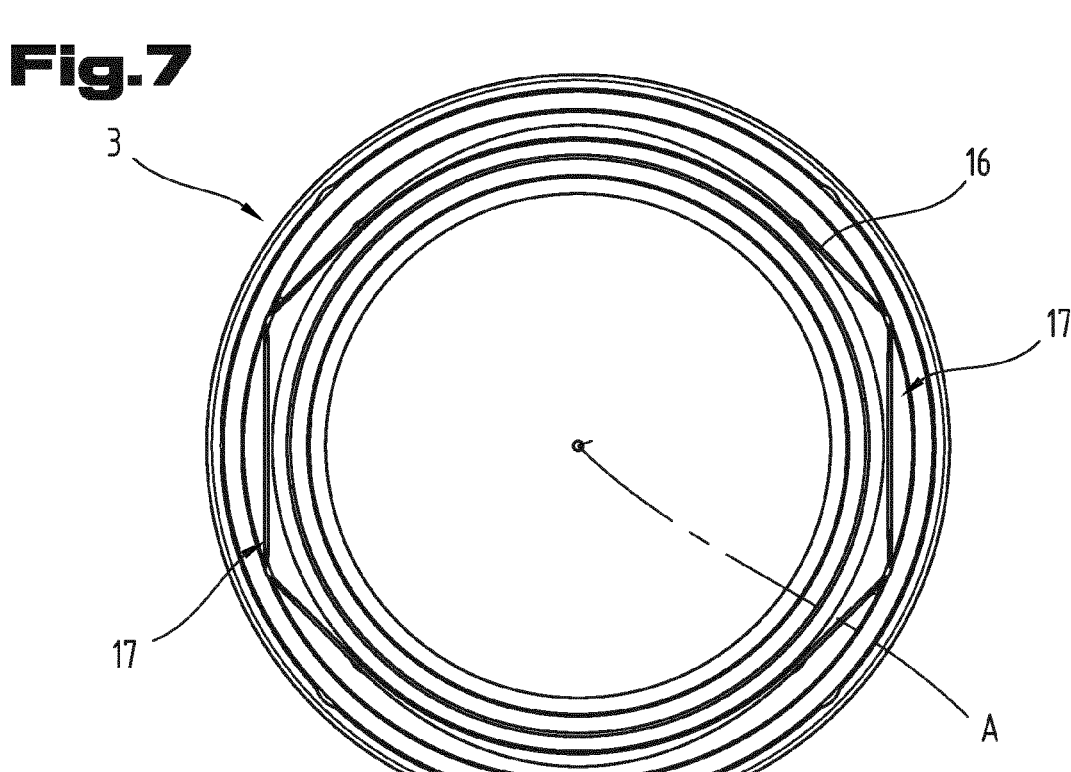
FIG. 7 a rear view of the clamping sleeve in FIG. 3.
Figure 8:
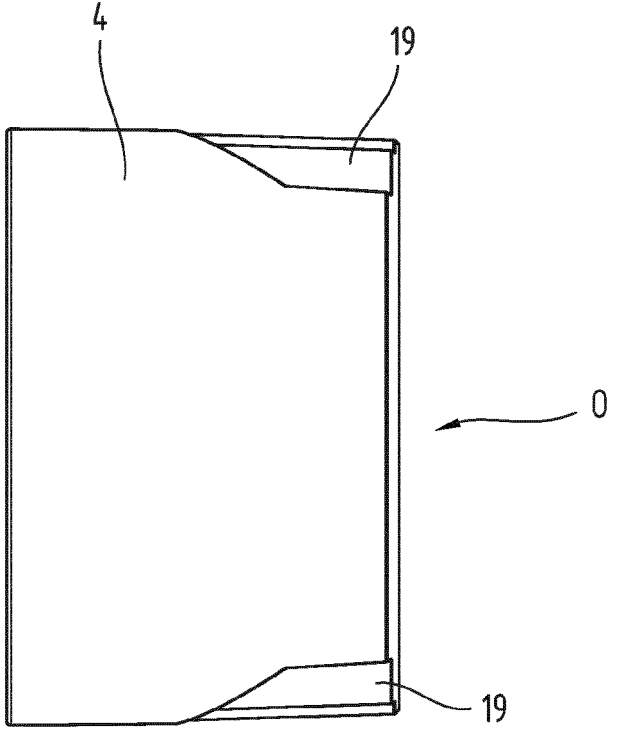
FIG. 8 a side view of a tightening sleeve according to the invention for use in a cable connector assembly.

As can be seen by comparing FIG. 6 with FIG. 8, the cross-sectional shape of the rear opening O of the tightening sleeve 4 substantially corresponds to the cross-sectional shape of the rear end of the clamping sleeve 3, in particular that of the projection 16 or the stop 16a. However, all radial distances for the tightening sleeve 4 are slightly smaller than those of the clamping sleeve 3, in particular of the stop 16a thereof, so that the cross-sectional area of the rear opening O of the tightening sleeve 4 is therefore slightly smaller than the cross-sectional area of the rear end of the clamping sleeve 3 or the projection 16 thereof or the stop 16a thereof.

On the outer surface of the tightening sleeve 4, grip surfaces 19 are provided at the circumferential positions of the locking pawls 18 or, if the guide 15 is provided on the inside of the tightening sleeve 4, at the locations of the steep flanks 15b, said grip surfaces 19 ensuring better handling of the tightening sleeve 4 due to the material and/or structuring. In addition, they indicate to the user the position of the locking pawls 18 or of the corresponding sections of the guide 15 that should advantageously be radially compressed during handling, in order to prevent the locking pawl 18, or the steep flank 15b, from slipping or jumping, thereby securely driving along the clamping sleeve 3 lying thereunder during rotation of the tightening sleeve 4.

In order to assemble the cable connector arrangement according to the invention, the tightening sleeve 4 is advantageously gripped on the grip surfaces 19 and rotated in the tightening direction of the threaded connection between the threads 5 and 6 of the housing 1 and the clamping sleeve 3. If necessary, after overcoming the play or a circumferential distance between the steep flank 15b of the groove 15 and the locking pawl 18 of the components lying opposite, namely the housing 1 and the clamping sleeve 3, the clamping sleeve 1 is driven along by the tightening sleeve 4 and the threaded connection is tightened. If desired, the tightening sleeve 4 can be rotated back and forth multiple times, always within the same angular range, in a similar manner to a ratchet arrangement, in order to tighten the threaded connection, which makes the cable connector arrangement even easier to assemble.

When the tightening sleeve 4 is rotated in the opposite direction, in the circumferential direction to release the threaded connection between the housing 1 and the clamping sleeve 3, the lock explained above does not engage and the tightening sleeve 4 spins freely without applying force to the threaded connection in the tightening direction. The locking pawl 18 of the tightening sleeve 4, for example, slides along the flat, long flank 15a of the guide in this case, without exerting a torque on the clamping sleeve 1 in the circumferential direction. The tightening sleeve 4 is shifted backwards only slightly in this case in the direction of the longitudinal axis A of the clamping sleeve 3, until the end of the flank 15a is reached, and the locking pawl 18 can then slide back to the front along the steep flank 15a.

A preferred embodiment of the invention includes at least one projection 21 on the outer surface of the clamping sleeve 3 as play compensation between the clamping sleeve 3 and the tightening sleeve 4, which projection 21 bridges the space between the clamping sleeve 3 and the tightening sleeve 4, at least for the most part. The projections 21, which, as relatively short or relatively long webs, are preferably oriented in the longitudinal direction of tightening sleeve 3, preferably bridge the space between the two coaxial sleeves 3, 4 entirely. The projections 21, which may also be in other forms, for example in the form of nubs or small circular webs, could also be arranged on the inside of the tightening sleeve 4. Positioning the projections 21 on both components 3, 4 is also possible, as long as the groups on the sleeves 3, 4 lying opposite one another are spaced apart from one another axially to avoid hindering the relative movement of the tightening sleeve 4 and the clamping sleeve 3. Two projections 21 are preferably arranged on the clamping sleeve 3 and, in terms of geometry and function, form an enveloping outer contour U with a substantially elliptical shape (see FIG. 6). The tightening sleeve 4 with a circular inner contour is slipped onto this elliptical clamping sleeve 3 and can be rotated without play on the clamping sleeve 3.

Figure 11:
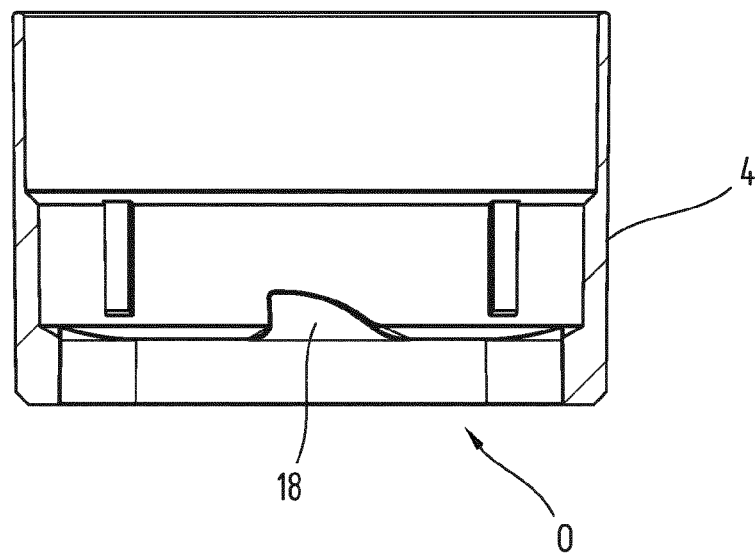
FIG. 11 a longitudinal section through the tightening sleeve in FIG. 7.

The clamping part 10, which is particularly advantageous for the cable connector arrangement according to the invention, but also in other kinds of connectors, is shown in FIG. 11 in its initial position in a view from behind of the clamping tongues 12. This clamping part 10 has the advantage that it can be used for cables K in a very wide range of diameters.

It preferably has two different kinds of clamping tongues 12, although other different kinds are also conceivable. Each clamping tongue 12a in a first group of clamping tongues 12 is wider than the clamping tongues 12b in the second group, at least at the front end facing away from the front edge 11 of the clamping part 10. The first clamping tongues 12a preferably widen continuously for this purpose as the distance from the front edge 11 of the clamping part 10 gets greater. The clamping tongues 12a in the first group are preferably beveled on their side edges, in such a manner that the width of the clamping tongues 12a decreases towards the longitudinal central axis of the clamping part 10. This beveling, which exerts a wedge effect on the adjacent clamping tongues in each case, preferably clamping tongues 12b in a second group of clamping tongues, during radial compression when screwing the housing 1 and clamping sleeve 3 of the cable connector arrangement, can also be provided for clamping tongues 12 with a constant width.

The clamping tongues 12 preferably of both groups typically have a section, mainly at the outermost end, which can exert a substantial clamping action on the cable K or can penetrate the cable jacket in a form-fitting manner or can deform said cable jacket.

The clamping tongues 12b of the second group are configured to be slightly narrower and their edges are typically parallel to one another over the entire length of the clamping tongues 12b. The clamping tongues 12b of the second group of clamping tongues 12 may be beveled on their side edges, in such a manner that the width of the clamping tongues 12b increases towards the longitudinal central axis of the clamping part 10. A region that is transversely ribbed or similarly structured to increase the holding effect on the cable K and ensures a high clamping effect by increasing friction or through the form-fitted, at least partial penetration of the cable jacket, extends from the outer end of the clamping tongues 12b of the second group almost to the inner end.

Viewed in the circumferential direction, a clamping tongue 12b of one group advantageously lies between two clamping tongues 12a of another group. Where there are two different kinds of clamping tongues 12, as in the exemplary embodiment shown, each clamping tongue 12a of a first group is followed by a clamping tongue 12b of the second group, and vice versa. Other sequences are also conceivable, such as two clamping tongues of one group flanked by clamping tongues of the second group, or alternating groupings always of two clamping tongues of each different group, etc.

Figure 12:
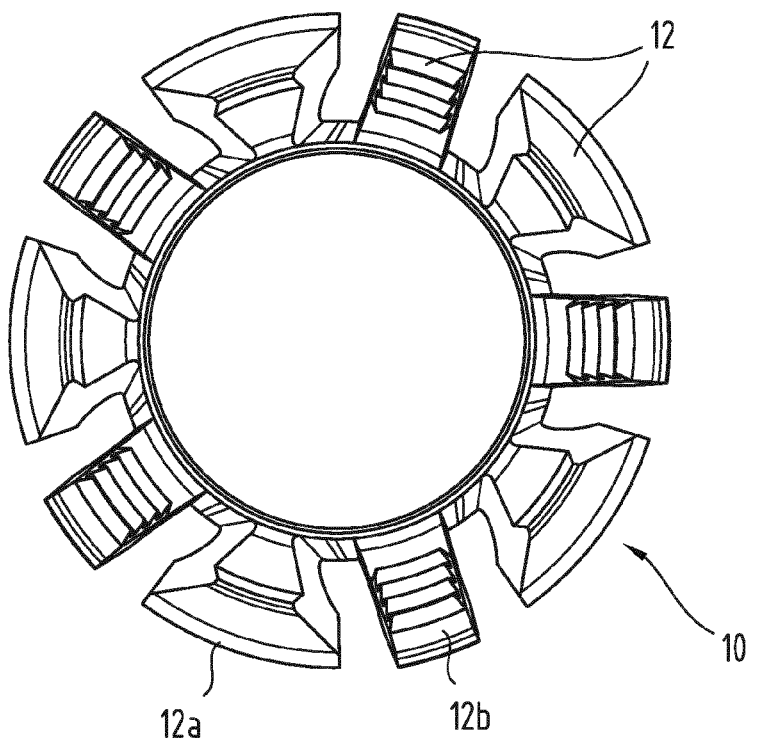
FIG. 12 a rear view of a clamping part according to the invention for use in a cable connector assembly in its state with the largest internal diameter, prior to insertion into the cable connector assembly.
Figure 13:
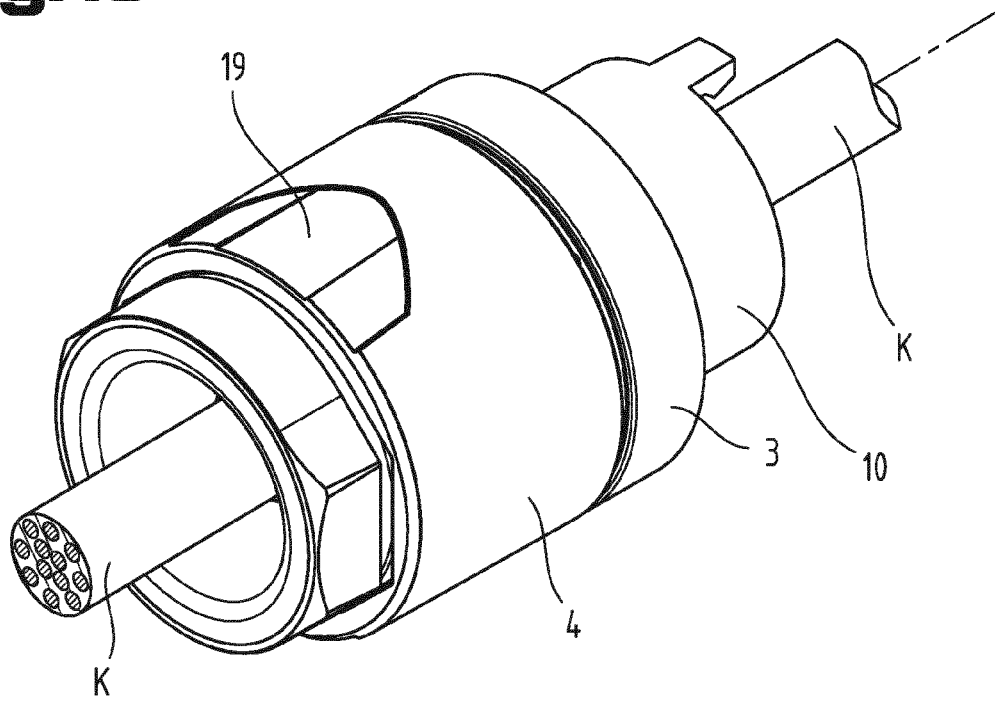
FIG. 13 a perspective view of an assembly according to the invention comprising a clamping part, clamping sleeve and tightening sleeve, in its state for use with a cable with the largest possible diameter.

In FIG. 12, a perspective view shows an arrangement of the clamping part 12, clamping sleeve 3, tightening sleeve 4 and sealing sleeve 13 used with a cable K with a very large diameter. The view in FIG. 13 is produced from the front, viewed from the direction of the housing 1 (not shown here). It can be seen here that the clamping tongues 12 of both groups 12a and 12b are nearly aligned with the other sections of the clamping part 10, only slightly compressed in a radially tapering manner towards the rear end of the clamping tongues 12, and lie flat on the cable K to clamp it through the combined action of groups 12a and 12b.

Figure 14:
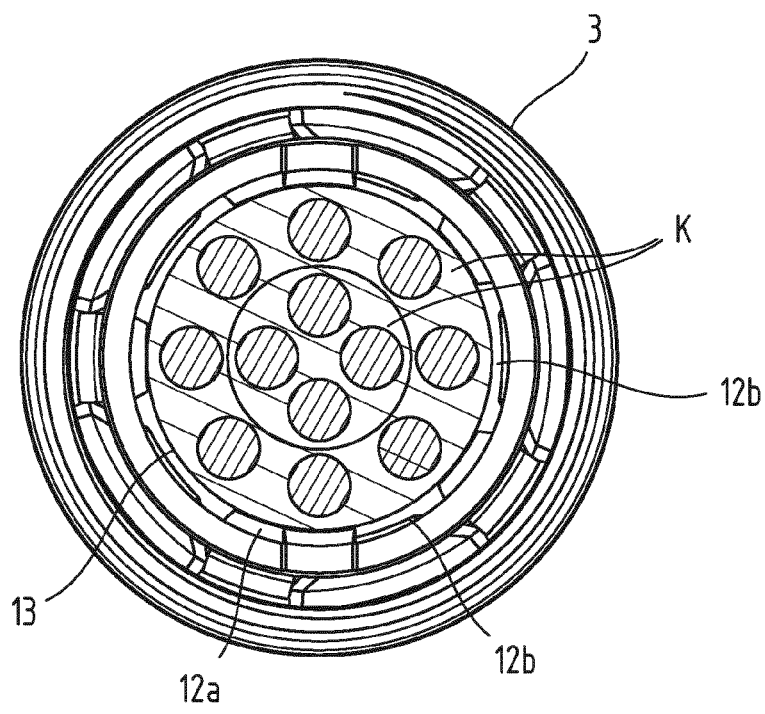
FIG. 14 a front view of the assembly in FIG. 12.

In contrast, FIG. 14 shows a view of the arrangement in FIG. 12 from the same direction as FIG. 13, but this time for a cable K with a very small diameter. In this case, the clamping sleeve 3 can be screwed very far forwards onto the housing 1, pressing the clamping tongues 12 radially inwards. The side edges of the clamping tongues 12 of different groups come to rest against one another in this case, and with further radial compression during the tightening of the threaded connection, the clamping tongues 12b of the second group are pressed more strongly inwards and onto the cable K or into the jacket of the cable K by the beveled side surfaces of the clamping tongues 12a of the first group. The clamping of the cable K in this case is primarily achieved by the clamping tongues 12b of the second group.

As can also be seen from FIGS. 13 and 14, the clearance width in this case, i.e. the inner diameter of the clamping part

10 available for passing through the cable K, is only marginally smaller than the outer diameter of the clamping part 10, and also of the housing 1 and the clamping sleeve 3, which may therefore be very thin-walled and not increase the diameter of the cable connector arrangement to any substantial extent. In this case, the clearance width is consistently between 70 and 80% of the diameter of the clamping part 10, but particularly between 75 and 95%. On the other hand, when the clamping sleeve 3 is screwed to the maximum onto the housing 1 of the cable connector arrangement, the clamping tongues 12 are in their maximally compressed state, in both the circumferential and radial directions. The clamping tongues 12a of the first group of clamping tongues 12 rest with their side edges against one another in this case and press the clamping tongues 12b of the second group inwards to the maximum. This results in the smallest possible clearance width between the clamping tongues 12, in particular between the clamping tongues 12b of the second group, wherein the diameter for passing the cable K through the clamping part 10 is between 20 and 40% of the diameter of the clamping part. This value is preferably between 10 and 30%. In relation to the housing 1 and the clamping sleeve 3, the maximum and minimum values for the clearance width are 60 and 80% of the diameter thereof or around 5 and 20% of the diameter thereof, respectively.

Figure 15:
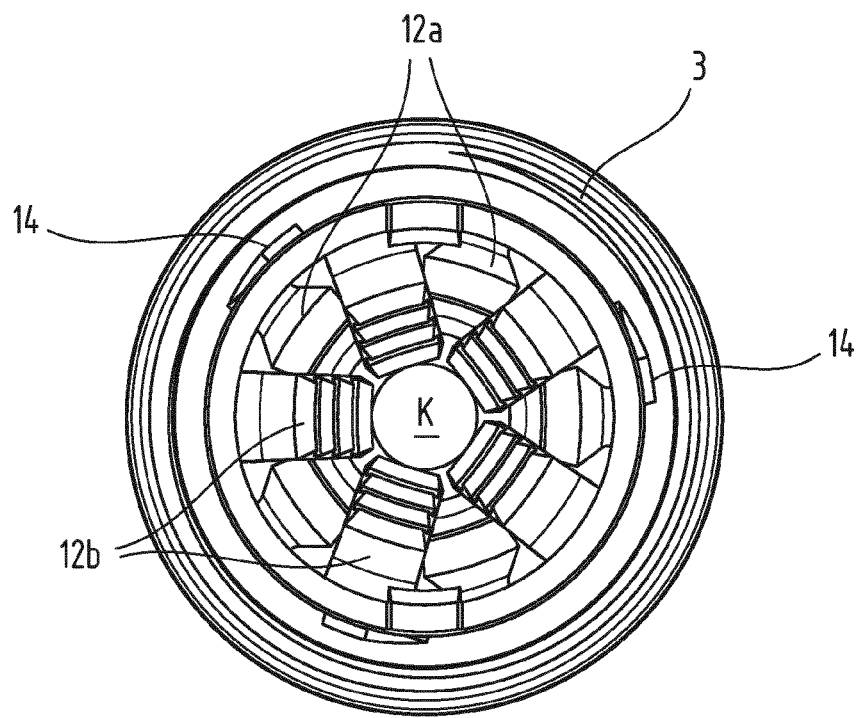
FIG. 15 a front view of the assembly corresponding to FIG. 12, in its state for use with the smallest possible cable diameter.
Figure 16:
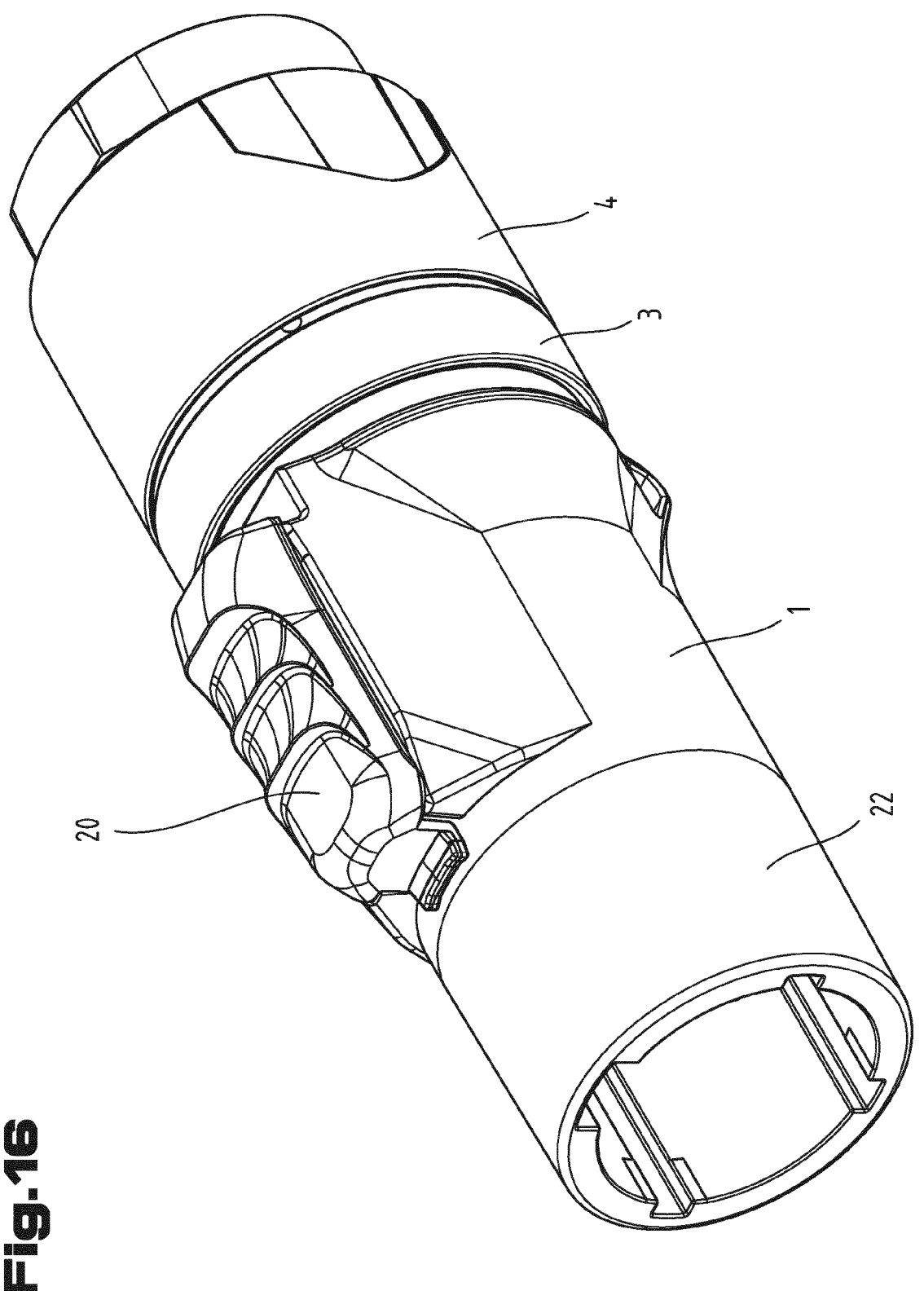
FIG. 16 a perspective view of another embodiment of a cable connector assembly according to the invention.

FIG. 15 shows another embodiment of the cable connector arrangement according to the invention, wherein identical reference signs and component names to those in the preceding drawing figures are in turn used for identical parts. Instead of a connector extension 2, the housing 1 now has a preferably integrally formed plug-in extension 22. Apart from this difference, the structure and function are the same as explained previously in connection with FIGS. 1 to 14. The housing 1 and the connector extension 2 or the plug-in extension 22 may therefore vary depending on the connector type, in order to cover all common connectors and contact types, from XLR connectors, data connectors such as RJ45, through all possible standard or proprietary types.

Figure 17:
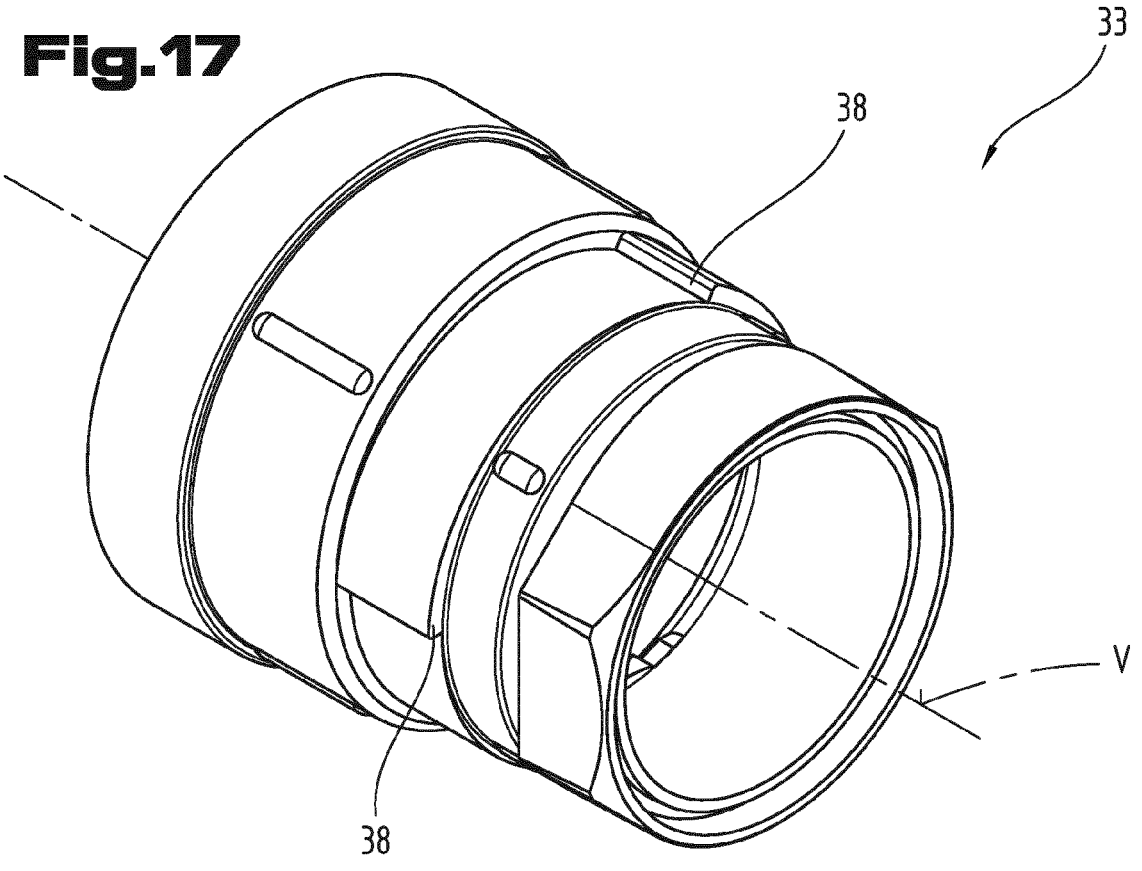
FIG. 17 a perspective view of a clamping sleeve in another embodiment of the invention and FIG. 18 a cross section through a tightening sleeve for the clamping sleeve in FIG. 17.
Figure 18:
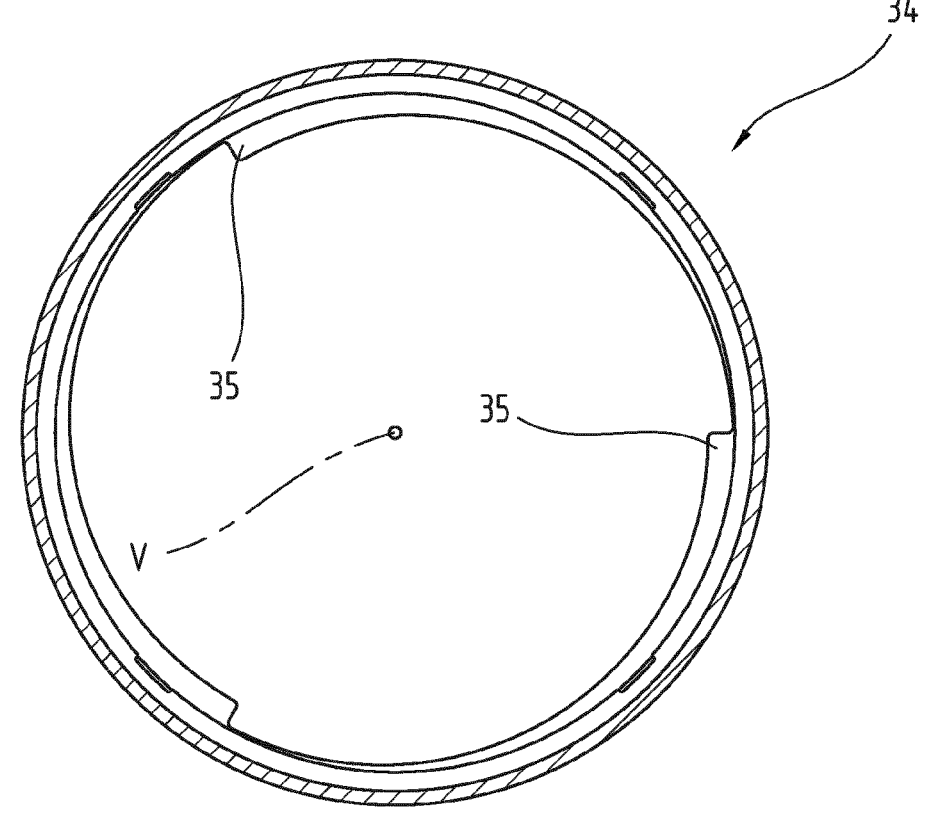

While the embodiment described hitherto and shown in FIGS. 1 to 15 provides for the height of the guide 15 and the locking pawl 18 changing in a direction parallel to the axis of rotation of the clamping sleeve 3 and the tightening sleeve 4, other configurations are also possible. FIG. 17 therefore illustrates an embodiment in which a guide 35 is formed on the inside of a tightening sleeve 34, the height of which changes in the radial direction relative to the axis V of the relative rotation of this tightening sleeve 34 and a complementary clamping sleeve 33. In this case, locking pawls 38 are arranged on the outside of this latter clamping sleeve 33, as can be seen in FIG. 18, which also have heights that change in the radial direction relative to the axis V. These guides 35 and locking pawls 38 engage in the same manner or they can slide past one another with minimal radial protrusion of the tightening sleeve 34, as explained for the previously described radially height-variable guide-locking pawl system.

In addition to the embodiments explained above with fixed structures for the lock, constructions are also conceivable in which a tool does not act on the clamping sleeve 3 itself, but in which a locking element between the clamping sleeve 3 and the tightening sleeve 4 can be brought into a position by means of a tool that allows for a non-rotatable, possibly temporary coupling between the clamping sleeve 3 and the tightening sleeve 4. For example, by means of a pin or a screwdriver that can be inserted into a preferably axial opening of the cable connector arrangement, an inner locking pin could be displaced or a locking pawl pivoted, which connect the clamping sleeve 3 and the tightening sleeve 4 in a non-rotatable manner.

The exemplary embodiments show possible variants, wherein it should be noted at this point that the invention is not limited to the specifically illustrated variants, but instead various combinations of the individual variants among themselves are also possible, and this ability to vary is within the capability of those skilled in the art in this field of expertise based on the teachings of the present invention.

The scope of protection is determined by the claims. However, the description and the drawings should also be used to interpret the claims. Individual features or combinations of features from the various exemplary embodiments shown and described can represent independent inventive solutions in themselves. The object underlying the independent inventive solutions can be inferred from the description.

All statements regarding ranges of values in this description are to be understood as encompassing any and all sub-ranges, e.g. the range from 1 to 10 is to be understood as encompassing all sub-ranges starting from the lower limit of 1, or more, and ending at an upper limit of 10, or less, e.g. 1 to 1.7, or 3.2 to 8.1 or 5.5 to 10.

For clarity, it should finally be noted that in order to provide a better understanding of the structure, elements have in some cases been shown not to scale and/or enlarged and/or reduced in size.

LIST OF REFERENCE SIGNS

1 Housing
2 Plug extension
3 Clamping sleeve
4 Tightening sleeve
5 External thread
6 Internal thread
7 Sealing ring
8 Spring element
9 Guide web
10 Clamping part
11 Front edge
12 Clamping tongue
12a First clamping tongue
12b Second clamping tongue
13 Sealing sleeve
14 Locking pawl
15 Guide
15a Flat flank
15b Steep flank
16 Projection
16a Stop
17 Engagement points
18 Locking pawl
19 Grip surface
20 Unlocking slide
21 Elevation
22 Plug-in extension
A Longitudinal central axis
O Rear opening
U Enveloping outer contour

The invention claimed is:
1. A clamping part for clamping a cable in a cable connector assembly, the clamping part comprising:
at least one radially compressible section that encloses the cable and clamps the cable in the compressed state;

a front edge region for resting against at least one of a
housing of the cable connector assembly or a connector
extension inserted therein;

a rear section formed by a number of clamping tongues
distributed around a circumference of the clamping
part, and the clamping tongues include at least two
different kinds of the clamping tongues;

wherein each of the clamping tongues of a first group of
the clamping tongues is wider, at least at an end facing
away from the clamping part, than the clamping
tongues of a second group of the clamping tongues; and wherein the clamping tongues of the first group widen
continuously as a distance from the front edge region of
the clamping part increases.

2. The clamping part as claimed in claim 1, wherein the
clamping tongues in a first group of the clamping tongues
are beveled on side edges thereof, and a width increases as
a distance from a central axis of the clamping part becomes
radially greater.

3. The clamping part as claimed in claim 1, wherein the
clamping tongues of the first group have a section at ends
thereof which is adapted to exert a clamping action on a
cable for form-fitting penetration of a jacket of the cable.

4. The clamping part as claimed in claim 1, wherein each
of the clamping tongues of the second group of the clamping
tongues is narrower than the clamping tongues of the first
group.

5. The clamping part as claimed in claim 1, wherein side
edges of the clamping tongues of the second group extend
parallel to one another.

6. The clamping part as claimed in claim 1, wherein a
region that is adapted to increase a holding effect on the
cable extends from an outer end of the clamping tongues in
the second group of the clamping tongues toward an inner
end thereof.

7. The clamping part as claimed in claim 1, wherein the
clamping tongues are elastically compressible in a radial
direction.

\* \* \* \* \*